(12) United States Patent
Bollman

(10) Patent No.: US 12,215,724 B2
(45) Date of Patent: Feb. 4, 2025

(54) UNIVERSAL MOUNT PLATFORM SYSTEM WITH RING MOUNT PLATFORM AND LINEAR MOUNT PLATFORM

(71) Applicant: Clifford Bollman, Sun City West, AZ (US)

(72) Inventor: Clifford Bollman, Sun City West, AZ (US)

(*) Notice: Subject to any disclaimer, the term of this patent is extended or adjusted under 35 U.S.C. 154(b) by 0 days.

(21) Appl. No.: 18/629,777

(22) Filed: Apr. 8, 2024

(65) Prior Publication Data

US 2024/0288019 A1 Aug. 29, 2024

Related U.S. Application Data

(63) Continuation-in-part of application No. 17/672,680, filed on Feb. 15, 2022, now abandoned, and a
(Continued)

(51) Int. Cl.
| | |
|---|---|
| *A47B 13/06* | (2006.01) |
| *A47B 13/02* | (2006.01) |
| *A47B 21/04* | (2006.01) |
| *E04C 3/04* | (2006.01) |
| *E04C 3/29* | (2006.01) |
| *F16B 12/44* | (2006.01) |
| *F16B 7/18* | (2006.01) |

(52) U.S. Cl.
CPC .............. *F16B 12/44* (2013.01); *A47B 13/02* (2013.01); *A47B 21/04* (2013.01); *E04C 3/04* (2013.01); *E04C 3/29* (2013.01); *A47B 2200/0016* (2013.01); *E04C 2003/0413* (2013.01); *E04C 2003/0421* (2013.01); *E04C 2003/0439* (2013.01); *E04C 2003/0465* (2013.01); *F16B 7/187* (2013.01)

(58) Field of Classification Search
CPC .......... F16B 12/44; F16B 7/187; A47B 13/02; A47B 21/04; A47B 2200/0016; E04C 3/04; E04C 3/29; E04C 2003/0413; E04C 2003/0421; E04C 2003/0439; E04C 2003/0465
See application file for complete search history.

(56) References Cited

U.S. PATENT DOCUMENTS

| | | | |
|---|---|---|---|
| 11,859,385 B1* | 1/2024 | Zhou | ........................ E04C 3/06 |
| 2020/0260862 A1* | 8/2020 | Knapp | ................... A47B 21/03 |

(Continued)

*Primary Examiner* — Amy J. Sterling
(74) *Attorney, Agent, or Firm* — Rylander & Associates, PC; Philip R. M. Hunt

(57) ABSTRACT

A universal mount platform for office and industrial modular workstations including embodiments a ring mount platform module and a linear dual-rail mount platform module. A single rail ring mount platform has a ring rail that is a metal tube, square in cross-section, shaped as a ring, with a plurality of fastener holes penetrating vertically through the rail. A dual rail ring mount platform has a first ring rail and a second ring rail, both metal tubes, square in cross-section, the first ring rail having an inside radius that is larger than an outside radius of the second ring rail. A linear dual-rail mount platform module has two double rail slot columns coupled by two sets of dual rails. Mount slots between dual rails are set and maintained by spacers or end plates.

9 Claims, 13 Drawing Sheets

Related U.S. Application Data continuation of application No. 17/577,317, filed on Jan. 17, 2022, now Pat. No. 12,000,419, which is a continuation of application No. 17/027,705, filed on Sep. 22, 2020, now Pat. No. 11,236,774, which is a continuation-in-part of application No. 16/404,614, filed on May 6, 2019, now Pat. No. 10,781,841.

(60) Provisional application No. 63/305,256, filed on Jan. 31, 2022, provisional application No. 63/235,618, filed on Aug. 20, 2021, provisional application No. 63/149,632, filed on Feb. 15, 2021, provisional application No. 63/080,789, filed on Sep. 20, 2020.

(56) References Cited

U.S. PATENT DOCUMENTS

| | | | |
|---|---|---|---|
| 2022/0389709 A1* | 12/2022 | LeBlang | E04B 2/58 |
| 2023/0304289 A1* | 9/2023 | Smeding | E04C 3/08 |
| 2024/0237818 A1* | 7/2024 | Williams | A47B 21/04 |
| 2024/0254753 A1* | 8/2024 | Reddel | E04B 1/58 |

* cited by examiner

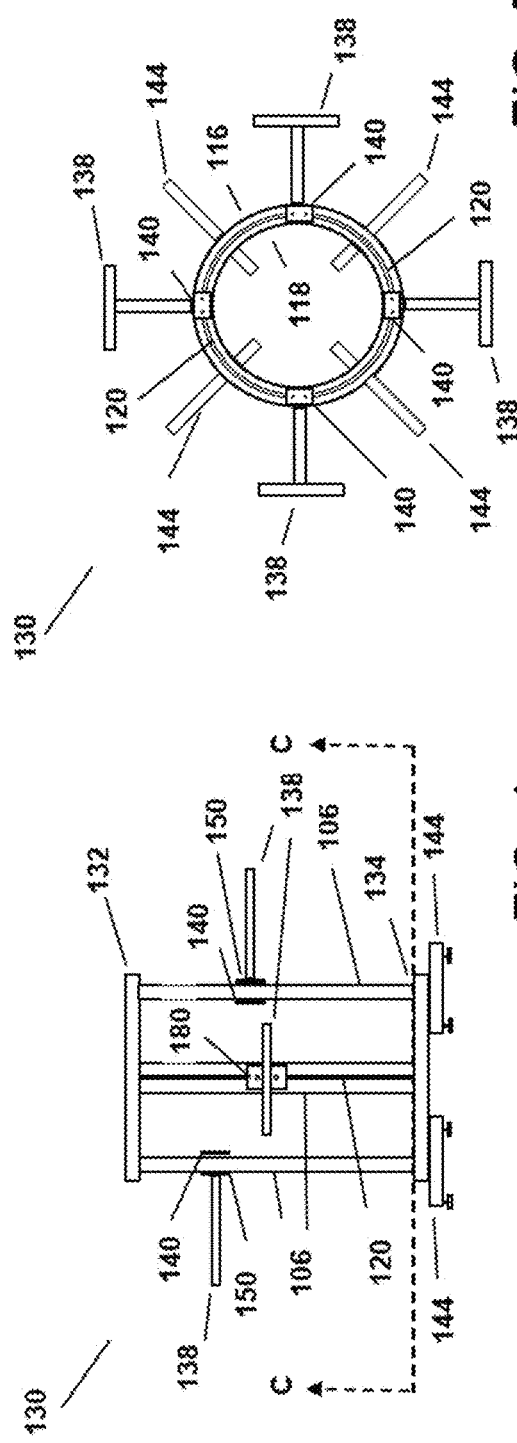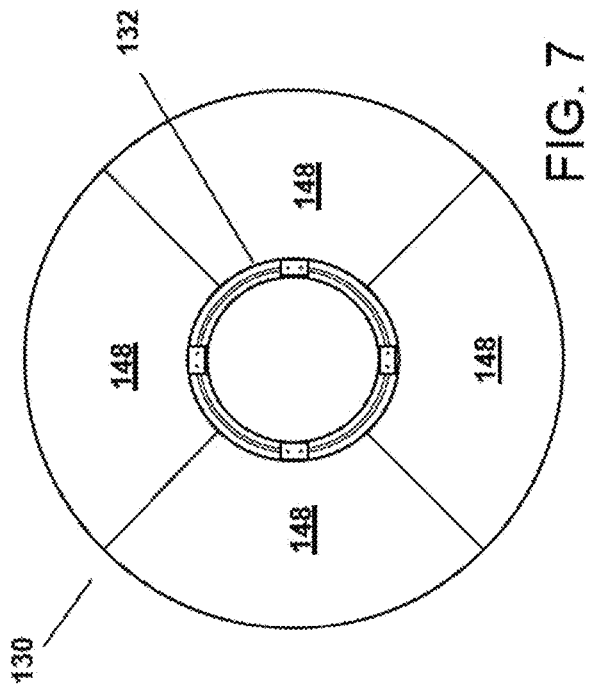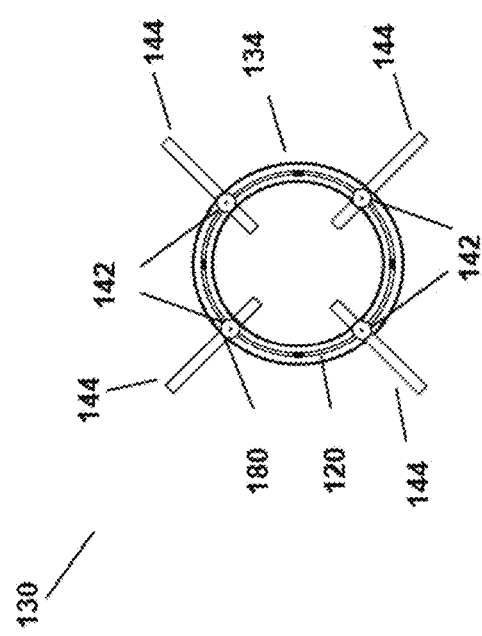

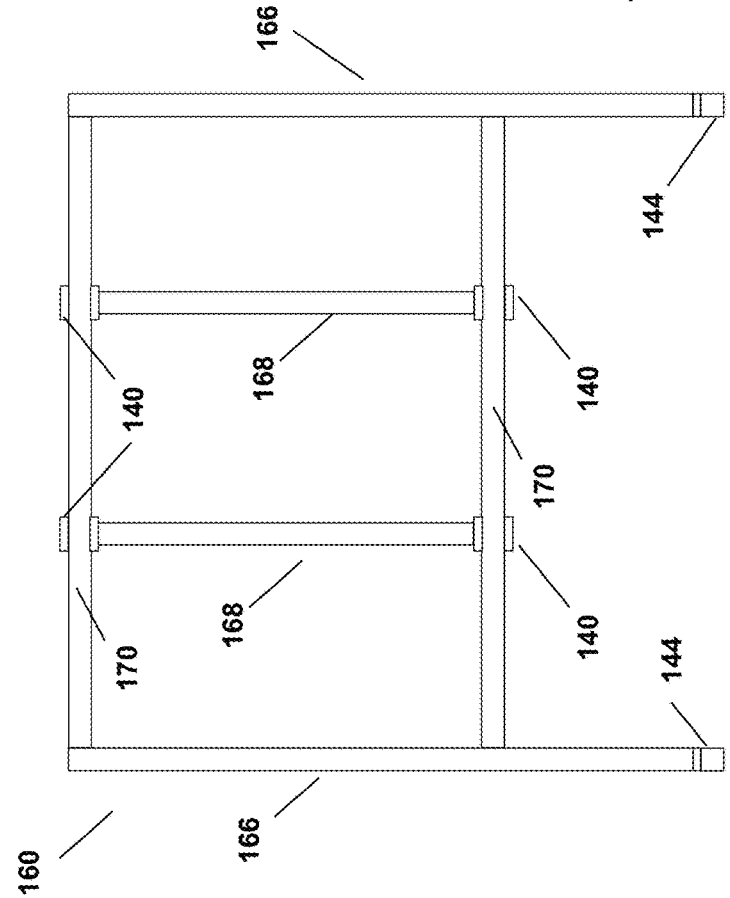
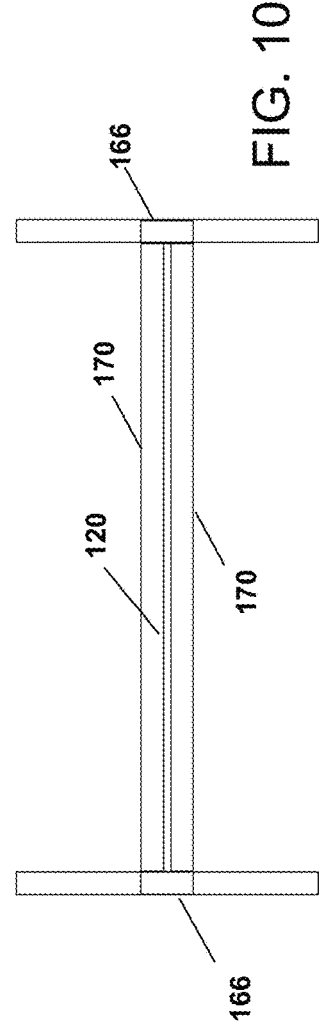
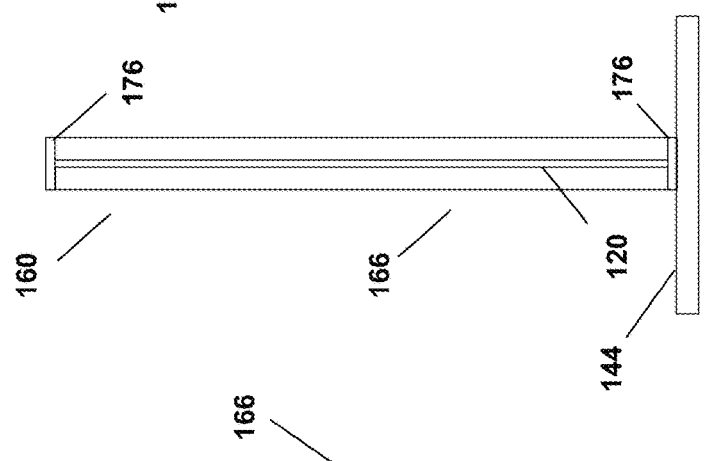

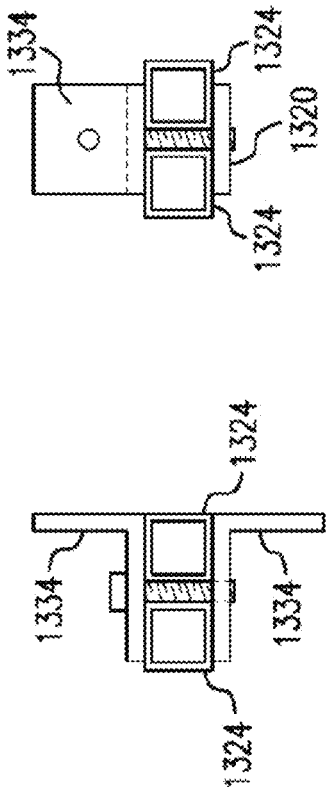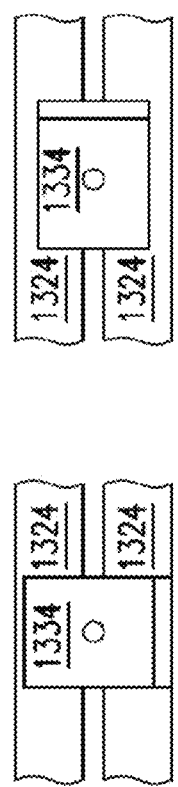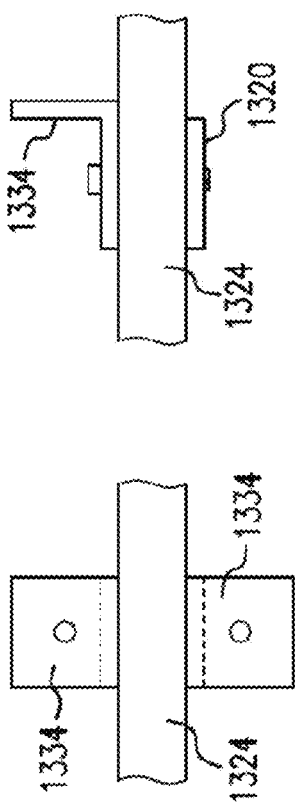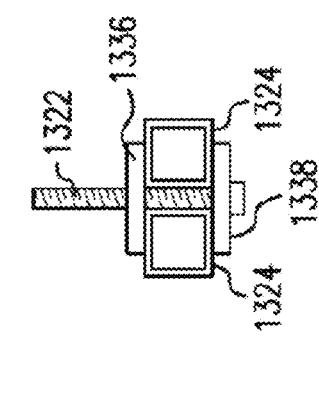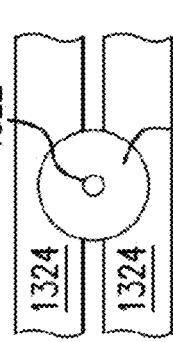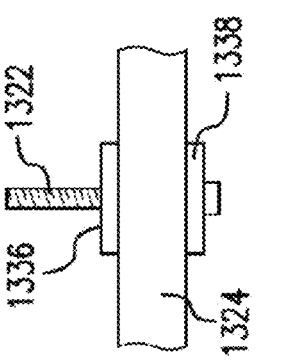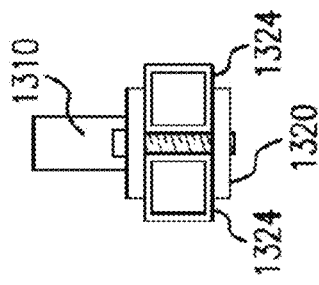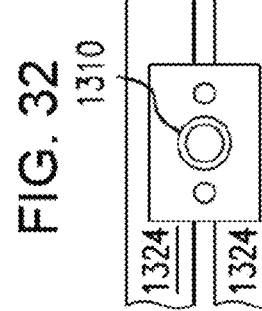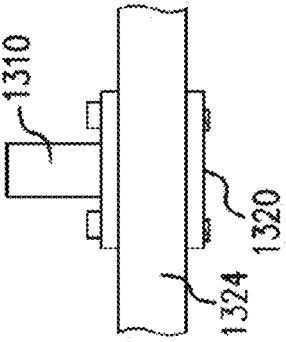

UNIVERSAL MOUNT PLATFORM SYSTEM WITH RING MOUNT PLATFORM AND LINEAR MOUNT PLATFORM

CROSS-REFERENCE TO RELATED APPLICATION

The present application is a continuation-in-part application of pending application Ser. No. 17/672,680, filed 2022 Feb. 15, which claims the benefit of U.S. Provisional Applications No. 63/149,632, filed 2021 Feb. 15, No. 63235618, filed 2021 Aug. 20, No. 63305256, filed 2022 Jan. 31, all incorporated herein by reference. The present application is a continuation-in-part application of pending application Ser. No. 17/577,317, filed 2022 Jan. 17, which is a continuation of application Ser. No. 17/027,705, filed 2020 Sep. 22, now U.S. Pat. No. 11,236,774, issued 2022 Feb. 1, which is a continuation-in-part application of application Ser. No. 16/404,614, filed 2019 May 6, now U.S. Pat. No. 10,781,841, issued 2020 Sep. 22, all incorporated herein by reference. This application, though application Ser. No. 17/027,705, claims the benefit of U.S. Provisional Application No. 63/080,789, filed 2020 Sep. 20, incorporated herein by reference.

TECHNICAL FIELD

The present invention relates to modular assembly systems. More particularly, the present invention relates to modular assembly systems for office and industrial workstations.

BACKGROUND

Modular building assembly systems have long been available to for the construction and erection of various structures such as office cubicles, industrial workstations, and scaffolding. Such modular building assembly systems often lack durability, strength and flexibility.

BRIEF DESCRIPTION OF THE DRAWINGS

The accompanying drawings, which are incorporated into and constitute a part of this specification, illustrate one or more embodiments of the inventive subject matter and, together with the detailed description, serve to explain the principles and implementations thereof. Like reference numbers and characters are used to designate identical, corresponding, or similar components in different figures.

FIG. 4 shows a side view of a second embodiment of a ring mount platform module 130.

FIG. 5 shows a top view of the second embodiment ring mount platform module 130.

FIG. 6 shows a top view sectional of the second embodiment ring mount platform module 130

FIG. 7 shows a top view of the second embodiment ring mount platform module 130 with four quarter circle shelves 148.

FIG. 9 shows a front view of a first embodiment of a welded linear dual-rail mount platform module 160.

FIG. 10 shows a top view of the first embodiment of the welded linear dual-rail mount platform module 160.

FIG. 11 shows a side view of the first embodiment of the welded linear dual-rail mount platform module 160.

FIG. 12 shows a side view of a shorter double rail slot column 168.

FIGS. 23, 24, and 25 respectively show a side sectional view, a top view, and a front view of a pair of L brackets clamped together on a pair of rails.

FIGS. 26, 27, and 28 respectively show a side sectional view, a top view, and a front view of an L bracket clamped with a threaded backer plate on a pair of rails.

FIGS. 29, 30, and 31 respectively show a side sectional view, a top view, and a front view of a fastener passing through an unthreaded washer and engaging a threaded washer to clamp a pair of rails.

FIGS. 32, 33, and 34 respectively show a side sectional view, a top view, and a front view of a post clamped to a threaded backer plate on the pair of rails.

DETAILED DESCRIPTION

Figure 1:
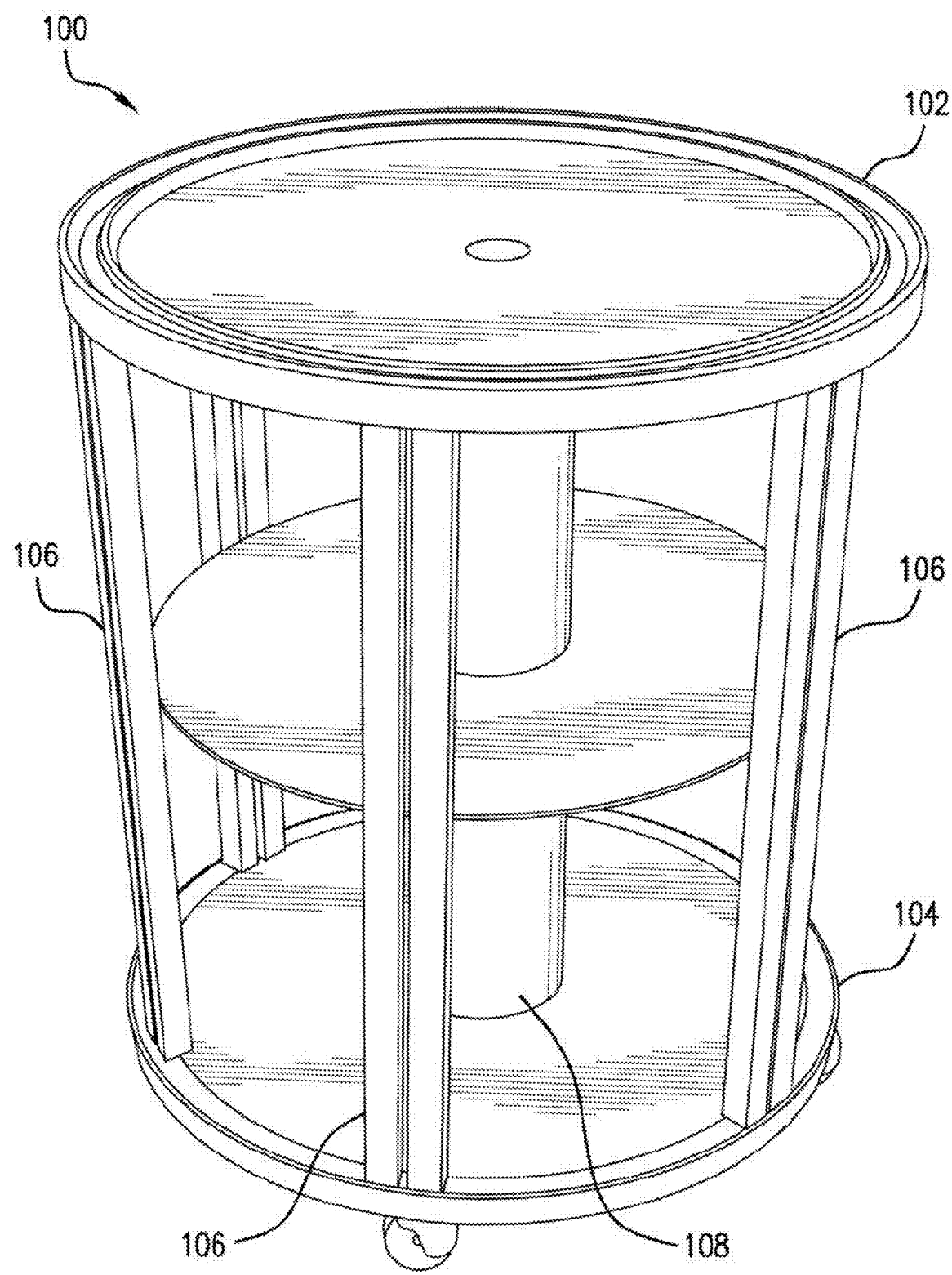
FIG. 1 shows a perspective view of a first embodiment of a ring mount platform module 100.

In describing the one or more representative embodiments of the inventive subject matter, use of directional terms such as "upper," "lower," "above," "below", "in front of," "behind," etc., unless otherwise stated, are intended to describe the positions and/or orientations of various components relative to one another as shown in the various Figures and are not intended to impose limitations on any position and/or orientation of any component relative to any reference point external to the Figures.

In the interest of clarity, not all of the routine features of representative embodiments of the inventive subject matter described herein are shown and described. It will, of course, be appreciated that in the development of any such actual implementation, numerous implementation-specific decisions must be made in order to achieve specific goals, such as compliance with application and business-related constraints, and that these specific goals will vary from one implementation to another and from one developer to another. Those skilled in the art will recognize that numerous modifications and changes may be made to the representative embodiment(s) without departing from the scope of the claims. It will, of course, be understood that modifications of the representative embodiments will be apparent to those skilled in the art, some being apparent only after study, others being matters of routine mechanical, chemical and electronic design. No single feature, function or property of the representative embodiments is essential. In addition to the embodiments described, other embodiments of the inventive subject matter are possible, their specific designs depending upon the particular application. As such, the scope of the inventive subject matter should not be limited by the particular embodiments herein described but should be defined only by the appended claims and equivalents thereof.

UNIVERSAL MOUNT PLATFORM SYSTEM

The Universal Mount Platform System is a flexible system for building ergonomic working stations that maximizes three-dimensional utilization of a workspace. The Universal Mount Platform System comprises substructure modules and accessory attachment mechanisms. The substructure modules provide the foundation on which the accessory attachment mechanisms may be mounted. The accessory attachment mechanisms hold physical components needed for the work of the workstation, such as tabletops or other work surfaces, lighting fixtures, computer monitors, cable management, and storage bins.

RAILS

Rails are the primary horizontal strength members in the Universal Mount Platform System. A rail is a tube, typically rectangular or square in cross section. Square tube rails are typically 1¼ inch square cross-section, 14-gauge tube thickness, but may have other suitable dimensions. In some alternative embodiments, a rail is a channel bar, rectangular or square in cross-section. In yet other alternative embodiments, the rail is a strut channel, rectangular or square in cross-section, with inwards-curving lips to facilitate mounting of components. Strut channel rails typically have a 1⅝ by 1⅝ inch square cross section but may have other suitable dimensions. In some embodiments, the strut channel rails have reinforcing bars across the open front of the channel at intervals along the length of the rail. In some embodiments, a rail may have fastener holes spaced at intervals along the rail to facilitate coupling to other rails, to position holders, slices, etc. The fastener holes typically penetrate through the rail orthogonal to the long axis of the rail. The fastener holes are typically circular but may be elongated slots in some embodiments. Perforated rails typically have fastener holes at 2-inch intervals. The fastener holes in the rails are typically unthreaded, but some may be threaded. A rail is typically made of metal, such as steel, but may be made of other suitable materials. In some embodiments, the rails may have end plates with fastener holes that may be threaded.

MULTI-RAIL MOUNT PLATFORMS

Many of the mount platforms in the Universal Mount Platform System are based on multiple parallel rails with gaps (slots) between the rails. The gaps are wide enough to just barely allow the shaft of a typical fastener used with the system to pass through, but not wide enough to allow the head of the typical fastener to pass through. In the embodiments shown and described herein, the typical fastener used has a ⅜" diameter shaft and the gaps are ¹³⁄₃₂." The rails and gaps provide a strong and flexible system for mounting of accessories. A typical accessory (such as a post) has a flange through which one or more fasteners pass. The one or more fasteners then pass through the gap between the rails and through holes in a backer plate. The fastener engages with a retainer on the other side of the backer plate or with the backer plate itself. Most typically, the fastener is threaded and engages with a threaded retainer or with a threaded hole in the backer plate.

RING MOUNT PLATFORM

FIG. 1 shows a perspective view of a first embodiment of a ring mount platform module 100 (alternatively, circle module) comprising a top ring mount platform 102, a bottom ring mount platform 104 with a plurality of double rail slot columns 106 and a center column 108 coupled between the top ring mount platform 102 and the bottom ring mount platform 104. The two ring mount platforms 102, 104 shown in FIG. 1 are perforated single rail ring mount platforms 110 (see FIG. 2). In other embodiments, the ring mount platforms 102, 104 may be dual rail ring mount platforms 112 (see FIG. 3) or channel ring mount platforms.

Figure 2:
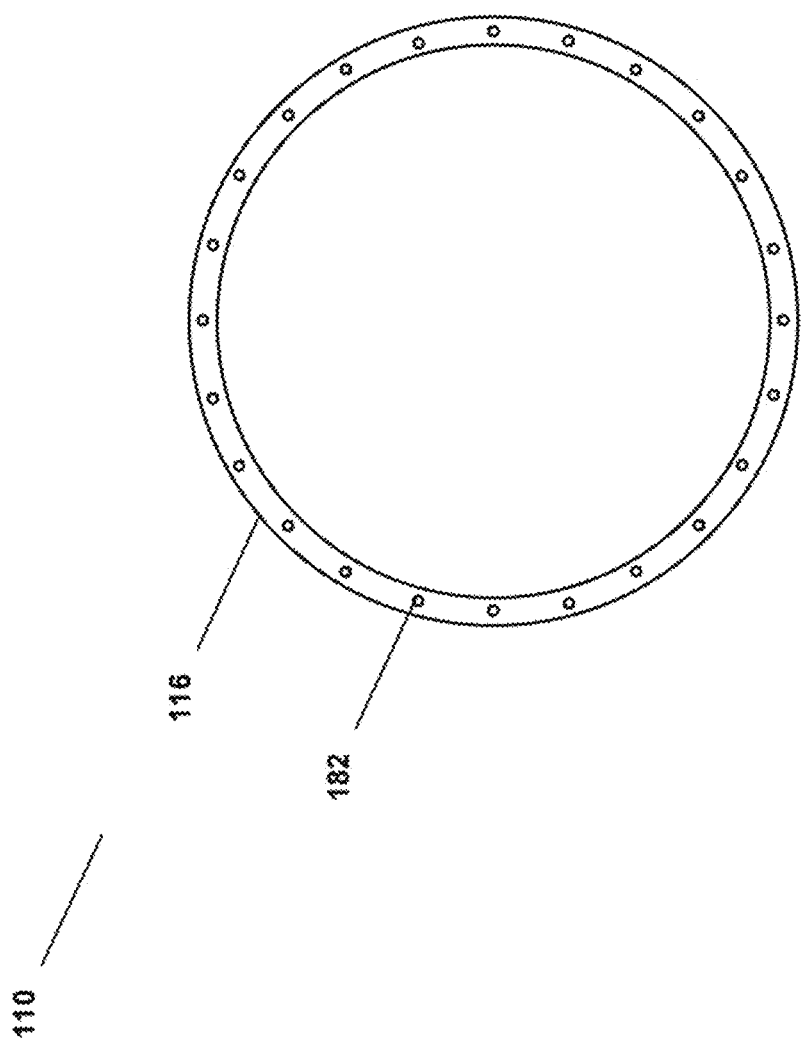
FIG. 2 shows a top view of an embodiment of single rail ring mount platform 110.

FIG. 2 shows a top view of an embodiment of single rail ring mount platform 110 having a first ring rail 116 that is a metal tube, square in cross-section, shaped as a ring, with a plurality of fastener holes 182 penetrating vertically through the rail. In some alternative embodiments, the first ring rail 116 is a solid bar, not a tube. In some alternative embodiments, the first ring rail 116 is made of suitable materials other than metal.

Figure 3:
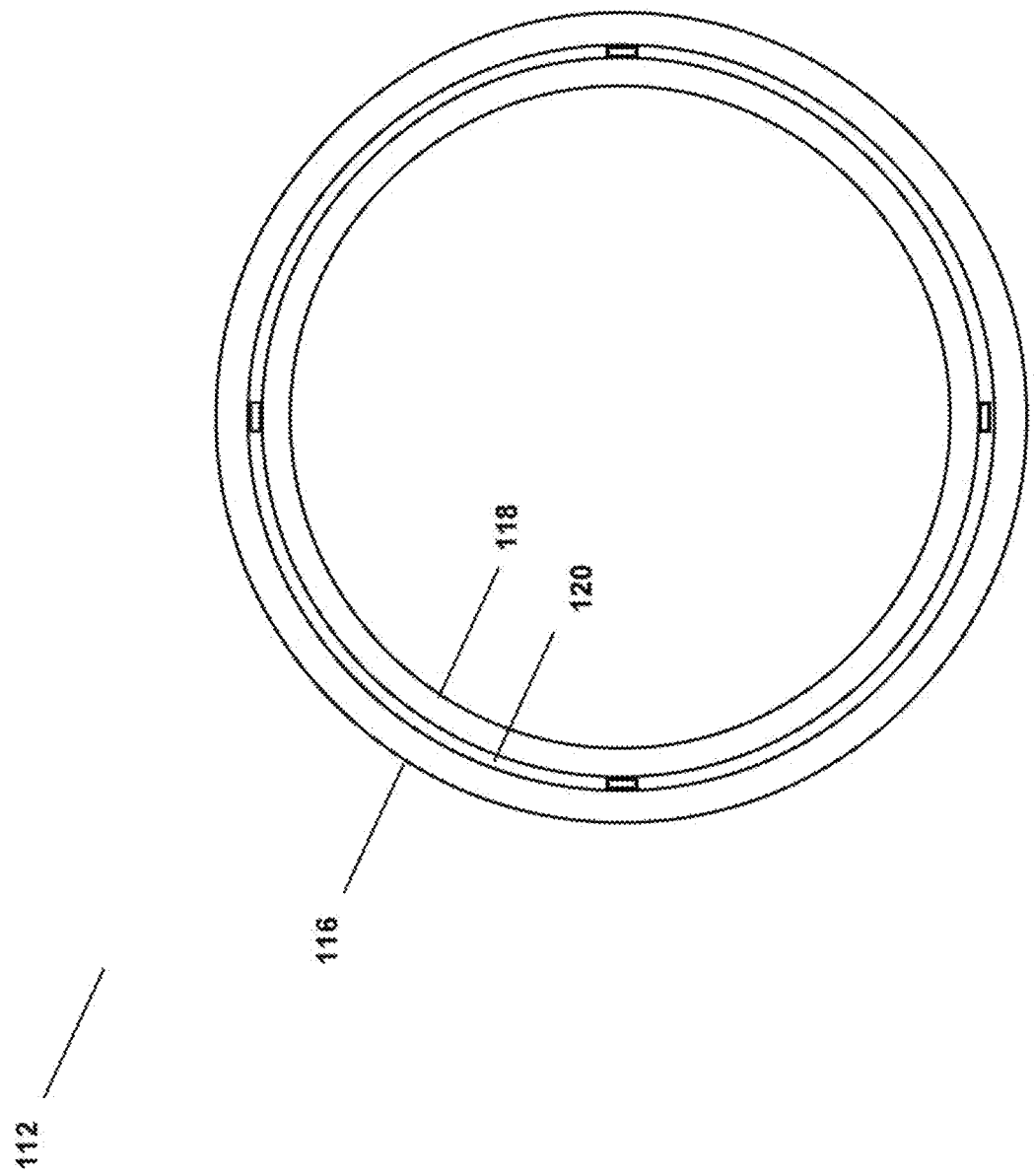
FIG. 3 shows top view of an embodiment of a dual rail ring mount platform 112.

FIG. 3 shows top view of an embodiment of a dual rail ring mount platform 112 with a first ring rail 116 and a second ring rail 118, both metal tubes, square in cross-section, the first ring rail 116 having an inside radius that is larger than an outside radius of the second ring rail 118. The second ring rail 118 is position inside the first ring rail 116 with a mount slot 120 (gap) between the two rail rings 116, 118. The first ring rail 116 is coupled the second ring rail 118 with a plurality of spacers 122. The mount slot 120 is wide enough to just barely allow passage of a shaft of a typical fastener used with the system, but not wide enough to allow a head of the typical fastener to pass through. In the embodiment shown in FIG. 3 the typical fastener used has a ⅜ inch diameter shaft and the gap is ⁷⁄₁₆ inch. In some alternative embodiments, the first ring rail 116 and/or the second ring rail 118 are solid bars. In some alternative embodiments, the first ring rail 116 and/or the second ring rail 118 are made of suitable materials other than metal.

FIG. 4 shows a side view of a second embodiment of a ring mount platform module 130 (alternatively, circle module) comprising a top ring mount platform 132 (crown), a bottom ring mount platform 134 (base) coupled by a plurality of double rail slot columns 106 and supported by a plurality of footings 144. FIG. 5 shows a top view of the second embodiment ring mount platform module 130. FIG. 6 shows a top view sectional of the second embodiment ring mount platform module 130 FIG. 7 shows a top view of the second embodiment ring mount platform module 130 with four quarter circle shelves 148. Each of the quarter circle shelves 148 are attached to and supported by one or more of the accessory arms 138, each of which are in turn are coupled to and supported by one of the double rail slot columns 106. The footings 144 can be of various lengths and mounted at locations where needed to counter forces from outwardly extending objects. The double rail slot columns 106 are coupled to the top ring mount platform 132 and bottom ring mount platform 134 at desired locations to form the body of the second embodiment ring mount platform module 130 while also providing attachment locations for accessory objects. The mount slots 120 in the top ring mount platform 132, bottom ring mount platform 134, and the double rail slot columns 106 provide attachment accessory objects upwards and/or outwards such as accessory arm 138, light fixtures, positioners and holders. Each double rail slot column 106 is coupled to the top ring mount platform 132 by passing one or more fasteners 180 through a backer plate 140, passing through the mount slot 120 in the top ring mount platform 132, then engaging the fasteners 180 with threaded holes in the top of the double rail slot column 106. Each double rail slot column 106 couples to the bottom ring mount platform 134 in a similar manner. Each Footing 144 is coupled to the bottom ring mount platform 134 by passing a fastener 180 through an unthreaded washer 142, passing through the mount slot 120 in the bottom ring mount platform 134, passing through the footing 144 and engaging with a threaded retainer. In some embodiments, the footing 144 has a threaded fastener hole with which the fastener 180 engages instead of a threaded retainer. Each accessory arm 138 coupled to one of the double rail slot columns 106 is coupled by passing one or more fasteners 180 through an accessory arm mount plate 150 of the accessory arm 138, passing through mount slot 120 in the double rail slot column 106, passing through one or more fastener holes 182 in a backer plate 140 and engaging with a threaded retainer. In some embodiments, the fastener holes 182 in the backer plate 140 are threaded, with which the fasteners 180 engage instead of threaded retainers.

Figure 8:
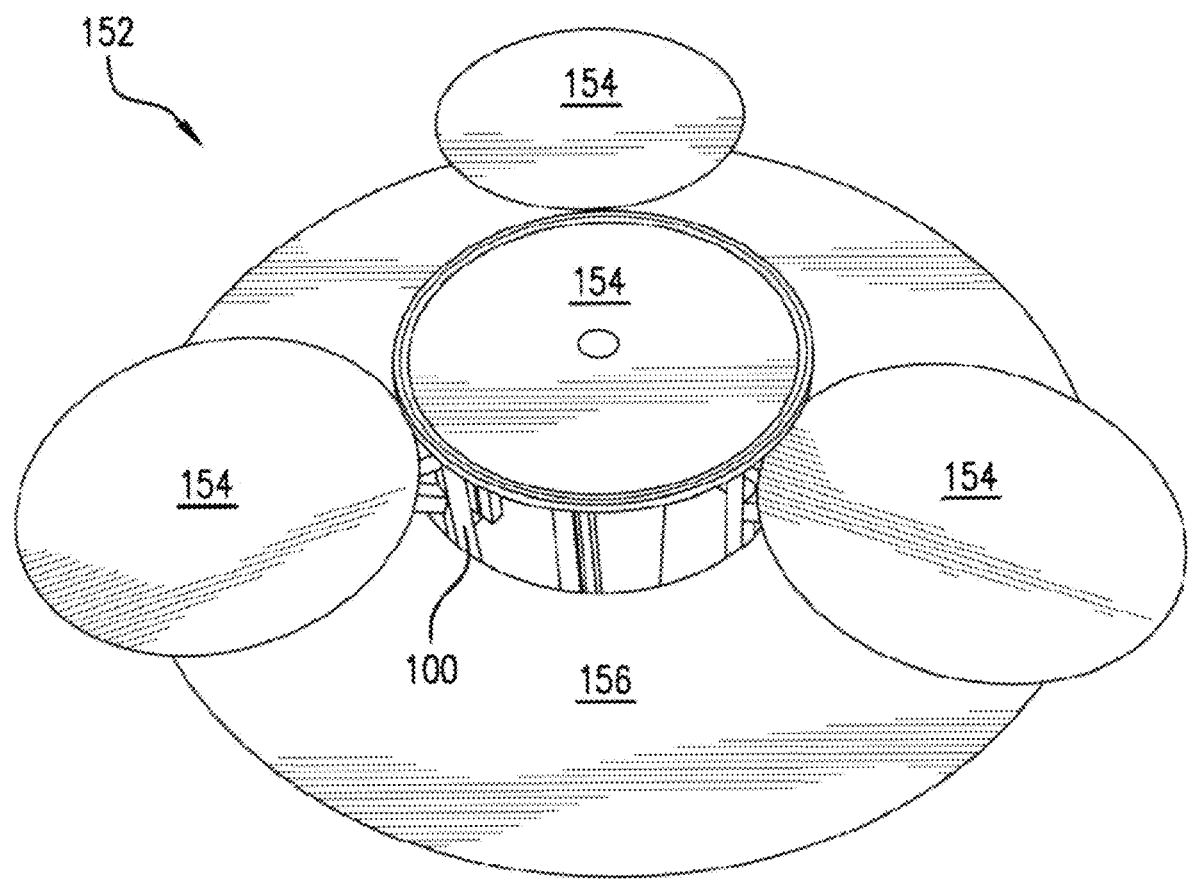
FIG. 8 shows a perspective view of an embodiment of a circular workstation 152 based on a first embodiment ring mount platform module 100.

FIG. 8 shows a perspective view of an embodiment of a circular workstation 152 based on a first embodiment ring mount platform module 100. In alternative embodiments, the second embodiment ring mount platform module 130 instead of the first embodiment ring mount platform module 100. The circular workstation 152 has a circular shelf 154 coupled to the top of the first embodiment ring mount platform module 100 and has three circular shelves 154 coupled by accessory arms 138 to the double rail slot columns 106. An annular self 156 is coupled by additional accessory arms 138 to the double rail slot columns 106.

WELDED LINEAR DUAL-RAIL MOUNT PLATFORM

FIG. 9 shows a front view of a first embodiment of a welded linear dual-rail mount platform module 160. FIG. 10 shows a top view of the first embodiment of the welded linear dual-rail mount platform module 160. FIG. 11 shows a side view of the first embodiment of the welded linear dual-rail mount platform module 160. FIG. 12 shows a side view of a shorter double rail slot column 168. The first embodiment welded linear dual-rail mount platform module 160 comprises two double rail slot columns 166 coupled by two sets of dual rails 170 by welding. In other embodiments, the double rail slot columns 166 are coupled to the rails 170 by fasteners. Each set of dual rails 170 are separated by a mount slot 120. The double rail slot columns 166 each have two rails with two end plates 176 weld to each end of the rails. The end plates 176 set and maintain the mount slot 120 between the rails of the first embodiment welded linear dual-rail mount platform module 160.

One or more double rail slot column 168 of shorter height may be coupled between and to the two sets of rails 170. This provides additional attachment points for accessories. Accessories attached in the mount slots 120 of the first embodiment welded linear dual-rail mount platform module 160 in the same manner as described in the first embodiment ring mount platform module 100. The construction double rail slot column 166, 168 are similar to the double rail slot columns 106 in the first embodiment ring mount platform module 100.

Figure 13:
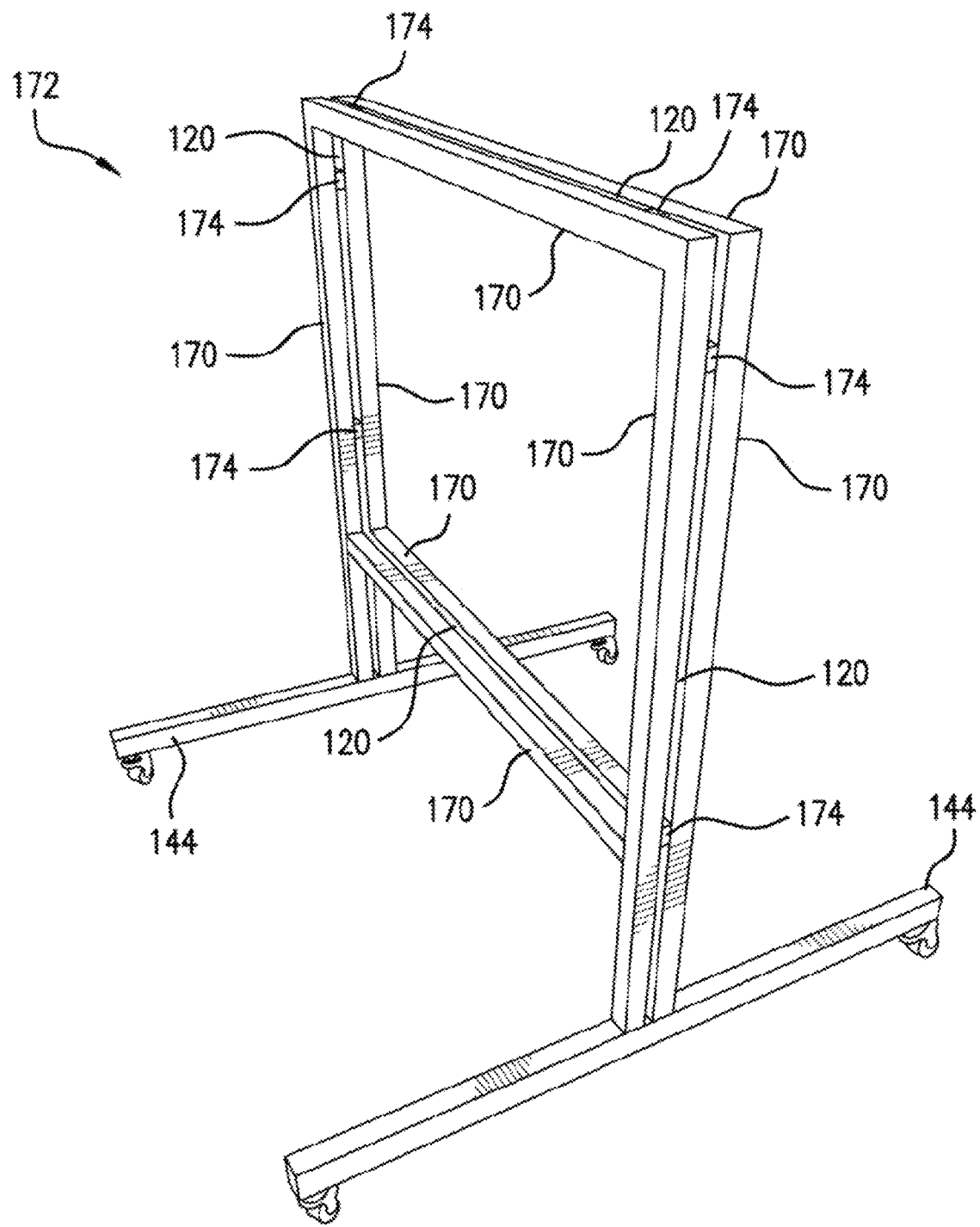
FIG. 13 shows a perspective view of a second embodiment welded linear dual-rail mount platform module 172.

FIG. 13 shows a perspective view of a second embodiment welded linear dual-rail mount platform module 172. The second embodiment welded linear dual-rail mount platform module 172 is similar to the first embodiment welded linear dual-rail mount platform module 160, However, instead of using end plates 176 to set and maintain the mount slots 120, the second embodiment welded linear dual-rail mount platform module 172 uses spacers 174 welded to the rails 170 inside the mount slots 120. Accessories attached in the mount slots 120 of the second embodiment welded linear dual-rail mount platform module 172 in the same manner as described in the first embodiment ring mount platform module 100.

Figure 14:
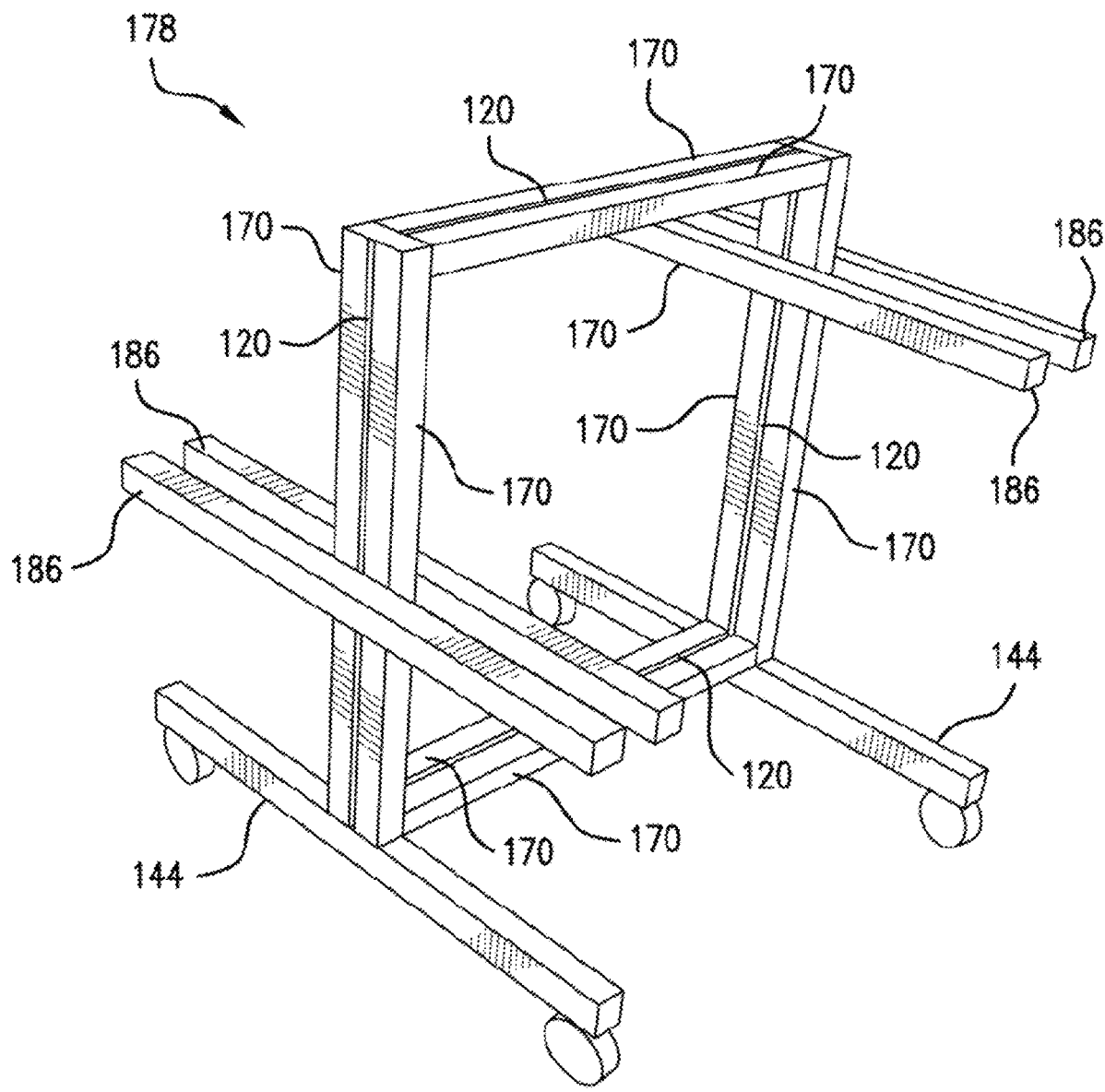
FIG. 14 shows a perspective view of a third embodiment welded linear dual-rail mount platform module 178.

FIG. 14 shows a perspective view of a third embodiment welded linear dual-rail mount platform module 178. The third embodiment welded linear dual-rail mount platform module 178 is similar to the second embodiment welded linear dual-rail mount platform module 172, except that the lower pair of horizontal rails 170 are positioned lower. Two sets of accessory arms 186 are attached. Accessories attached in the mount slots 120 of the third embodiment welded linear dual-rail mount platform module 178 in the same manner as described in the first embodiment ring mount platform module 100.

ACCESSORY ATTACHMENT MECHANISMS

The Universal Mount Platform System includes accessory attachment mechanisms such as positioning holders and arms for holding workstation accessories such as tabletops, lighting fixtures, cabinets, tool holders, computer monitors, etc. Accessory attachment mechanisms for use with the Universal Mount Platform are configured for attaching to rails, columns, platforms, or other components of a workstation module. The accessory attachment mechanisms typically are configured to allow repositioning of the accessory and in some cases, of the positioning holder itself. Accessories are attached by bolting, pinning, clamping, telescoping, wedging or nesting.

Figure 15:
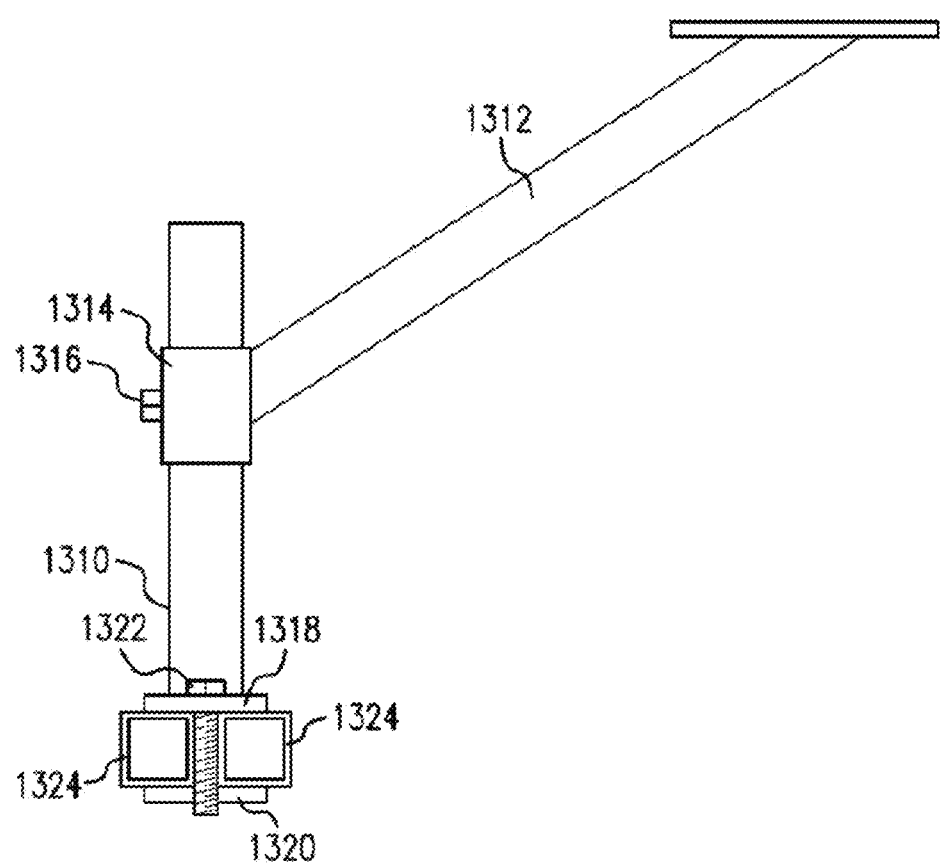
FIG. 15 shows an attachment mechanism comprising an arm coupled to a post with a sleeve and a retaining nut.
Figure 16:
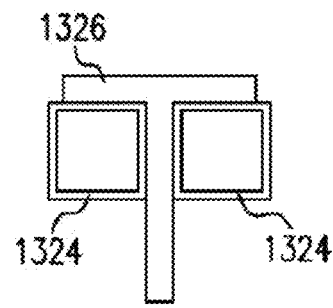
FIGS. 16, 17 and 18 show a T bracket from the side, front, and top respectively.
Figure 17:
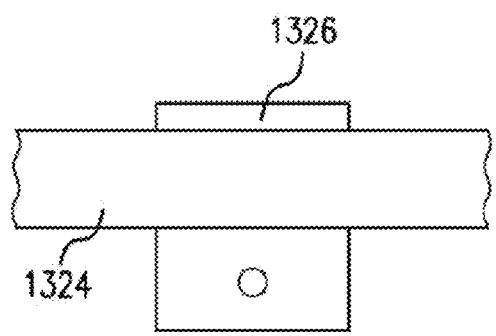
Figure 18:
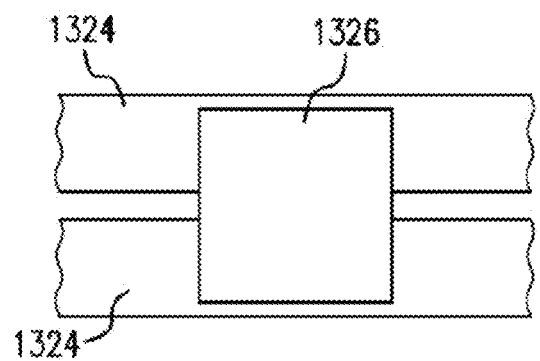
Figure 19:
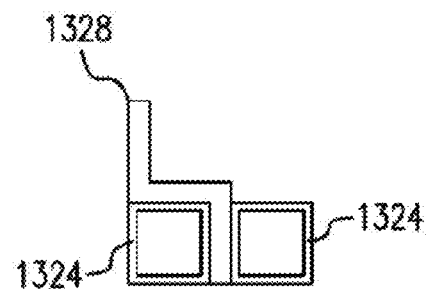
FIGS. 19, 20 and 21 show a Z bracket from the side, front, and top respectively.
Figure 20:
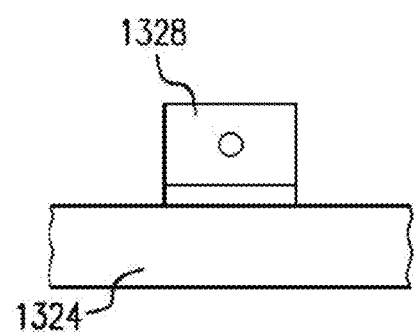
Figure 21:
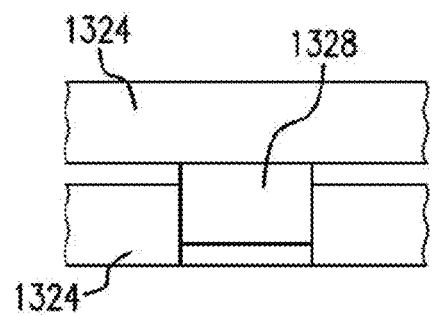
Figure 22:
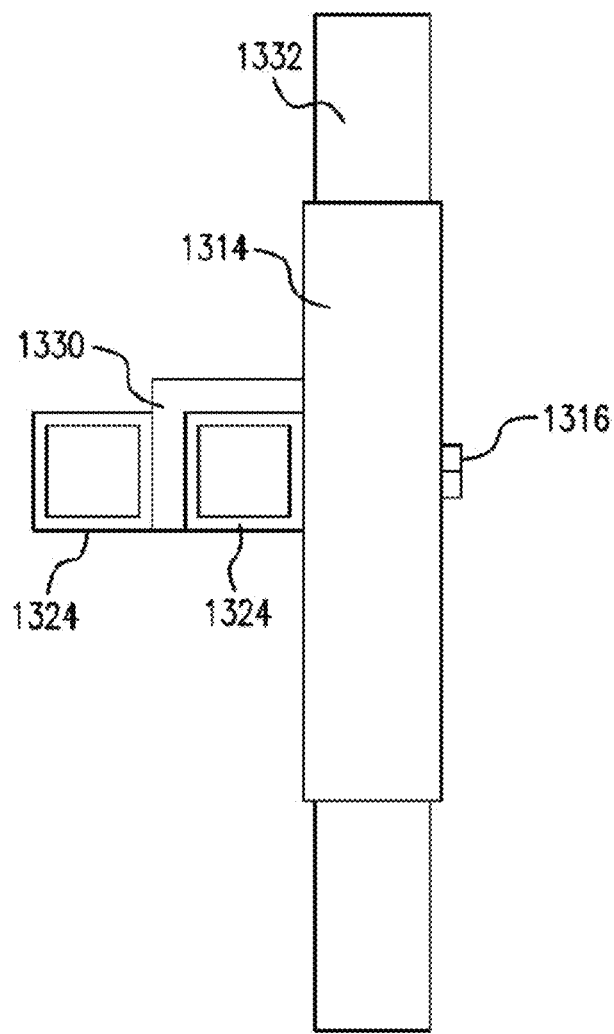
FIG. 22 shows an R bracket coupled to a sleeve and a telescoping tube in the sleeve.

FIGS. 15-34 show various types of accessory attachment mechanisms for use with the various platforms of the universal mount platform system. FIG. 15 shows an attachment mechanism comprising an arm 1312 coupled to a post 1310 with a sleeve 1314 and a retaining nut 1316. The post 1310 has a flange 1318 through which one or more fasteners 1322 pass. The fasteners 1322 pass between tube rails 1324 and engage with a backer plate 1320. FIG. 16 shows a T bracket 1326 from the side. FIG. 17 shows the T bracket 1326 from the front. FIG. 18 shows the T bracket 1326 from the top. FIG. 19 shows a Z bracket 1328 from the side. FIG. 20 shows the Z bracket 1328 from the front. FIG. 21 shows the Z bracket 1328 from the top. FIG. 22 shows an R bracket 1330 coupled to a sleeve 1314 with a retaining nut 1316 and a telescoping tube 1332 in the sleeve 1314. FIGS. 23, 24, and 25 respectively show a side sectional view, a top view, and a front view of a pair of L brackets 1334 clamped together on a pair of rails 1324. FIGS. 26, 27, and 28 respectively show a side sectional view, a top view, and a front view of an L bracket 1334 clamped with a threaded backer plate 1320 on a pair of rails 1324. FIGS. 29, 30, and 31 respectively show a side sectional view, a top view, and a front view of a fastener 1322 passing through an unthreaded washer 1338 and engaging a threaded washer 1336 to clamp a pair of rails 1324. FIGS. 32, 33, and 34 respectively show a side sectional view, a top view, and a front view of a post 1310 clamped to a threaded backer plate 1320 on the pair of rails 1324.

What is claimed is:

1. A workstation module comprising:
   a first double rail slot column;
   a second double rail slot column;
   wherein each of the double rail slot columns comprises a pair of vertical rails, arranged in parallel, a first end plate coupled to a first end of the pair of vertical rails and a second end plate coupled to a second end of the pair of vertical rails;
   a first pair of horizontal rails, arranged in parallel;
   a second pair of horizontal rails, arranged in parallel;
   wherein a first end of each of the pairs of horizontal rails is coupled to the first double rail slot column and a second end of each of the pairs of horizontal rails is coupled to the second double rail slot column;
   wherein each of the rails are tubular and rectangular in cross-section; and wherein each of the pairs of rails has a mount slot between the rails.

2. The workstation module of claim 1, further comprising: wherein the double rail slot columns are coupled to the pairs of horizontal rails by welding.

3. The workstation module of claim 1, further comprising: wherein the double rail slot columns are coupled to the pairs of horizontal rails by fasteners.

4. The workstation module of claim 1, further comprising: a third double rail slot column detachably coupled to the first pair of horizontal rails with a threaded fastener passed through the mount slot in the first pair of horizontal rails, the threaded fastener engaged with a threaded hole in the first end plate of the third double rail slot column.

5. The workstation module of claim 1, further comprising: wherein each of the rails are 1¼ inch square cross-section.

6. The workstation module of claim 1, further comprising: wherein each mount slot is ⅜ inch wide.

7. The workstation module of claim 1, further comprising: wherein each mount slot is no more than ⅜ inch wide.

8. The workstation module of claim 1, further comprising: wherein each mount slot is just wide enough to slip a standard bolt through.

9. The workstation module of claim 1, further comprising: wherein each mount slot between each pair of rails no wider than one of the rails in that pair.

* * * * *